(12) United States Patent
Miyake et al.

(10) Patent No.: US 11,287,014 B2
(45) Date of Patent: Mar. 29, 2022

(54) TRANSMISSION BELT AND TRANSMISSION BELT ELEMENT

(71) Applicant: AISIN CORPORATION, Kariya (JP)

(72) Inventors: Takayuki Miyake, Okazaki (JP); Akira Ochi, Anjo (JP); Wataru Ishihara, Anjo (JP); Junichi Tokunaga, Anjo (JP)

(73) Assignee: AISIN CORPORATION, Kariya (JP)

( * ) Notice: Subject to any disclaimer, the term of this patent is extended or adjusted under 35 U.S.C. 154(b) by 141 days.

(21) Appl. No.: 16/612,439

(22) PCT Filed: Jun. 6, 2018

(86) PCT No.: PCT/JP2018/021653
§ 371 (c)(1),
(2) Date: Nov. 11, 2019

(87) PCT Pub. No.: WO2018/225763
PCT Pub. Date: Dec. 13, 2018

(65) Prior Publication Data
US 2020/0096078 A1 Mar. 26, 2020

(30) Foreign Application Priority Data
Jun. 9, 2017 (JP) .............................. JP2017-114202

(51) Int. Cl.
*F16G 5/16* (2006.01)
*F16G 5/00* (2006.01)
(Continued)

(52) U.S. Cl.
CPC ................. *F16G 5/16* (2013.01); *F16G 5/00* (2013.01); *F16H 9/04* (2013.01); *F16H 9/16* (2013.01)

(58) Field of Classification Search
CPC ..... F16G 5/00; F16G 5/16; F16G 5/18; F16G 5/166; F16G 1/00; F16G 1/22; F16G 1/24
See application file for complete search history.

(56) References Cited

U.S. PATENT DOCUMENTS 4,365,965 A * 12/1982 Russ, Sr. ................. F16G 5/166
474/244
4,465,469 A * 8/1984 Cataldo ..................... F16G 5/16
474/201

(Continued)

FOREIGN PATENT DOCUMENTS

JP 2003-042235 A 2/2003
JP 2006-153089 A 6/2006

(Continued)

OTHER PUBLICATIONS

International Search Report of PCT/JP2018/021653 dated Aug. 28, 2018 [PCT/ISA/210].

*Primary Examiner* — Michael R Mansen
*Assistant Examiner* — Raveen J Dias
(74) *Attorney, Agent, or Firm* — Sughrue Mion, PLLC

(57) ABSTRACT

An element of a transmission belt includes a pair of rocking edge portions with a convex surface, these are formed on one of a front face and a rear face to extend a part of the rocking edge portion over a pillar portion, and the rocking edge portions are spaced away from each other in a width direction; and a non-contact portion extended along a saddle surface in the width direction between the rocking edge portions, in non-contact with an adjacent element. S/A≥3.5 is satisfied, when a sum of widths of end portions of the rocking edge portions on an outer peripheral side of the transmission belt is set as "A". A sum of surface areas of parts of the pillar portions on the outer peripheral side of the transmission belt is set as "S".

5 Claims, 5 Drawing Sheets

(51) Int. Cl.
*F16H 9/04* (2006.01)
*F16H 9/16* (2006.01)

(56) References Cited

U.S. PATENT DOCUMENTS

| | | | | |
|---|---|---|---|---|
| 5,123,880 | A * | 6/1992 | Sekine | F16H 9/24 474/244 |
| 7,066,858 | B2 * | 6/2006 | Smeets | F16G 5/16 474/201 |
| 8,109,851 | B2 * | 2/2012 | Kobayashi | F16G 5/16 474/201 |
| 8,187,129 | B2 * | 5/2012 | Kobayashi | F16G 5/16 474/242 |
| 8,337,347 | B2 * | 12/2012 | Kobayashi | F16G 5/16 474/201 |
| 8,647,223 | B2 * | 2/2014 | Kuwabara | F16G 5/16 474/242 |
| 8,690,719 | B2 * | 4/2014 | Sano | F16G 5/16 474/242 |
| 10,794,451 | B2 * | 10/2020 | Brandsma | F16H 9/24 |
| 10,883,567 | B2 * | 1/2021 | Brandsma | F16G 5/16 |
| 11,002,338 | B2 * | 5/2021 | Ninomiya | F16G 5/16 |
| 11,047,451 | B2 * | 6/2021 | Ochi | F16G 5/16 |
| 2002/0137585 | A1 * | 9/2002 | Smeets | F16G 5/163 474/242 |
| 2004/0053723 | A1 * | 3/2004 | Smeets | F16G 5/163 474/242 |
| 2004/0082417 | A1 * | 4/2004 | Smeets | F16G 5/16 474/242 |
| 2007/0072721 | A1 * | 3/2007 | Takagi | F16G 5/16 474/242 |
| 2009/0258743 | A1 * | 10/2009 | Kobayashi | F16G 5/16 474/248 |
| 2010/0016112 | A1 * | 1/2010 | Kobayashi | B29D 29/10 474/255 |
| 2010/0016113 | A1 * | 1/2010 | Kobayashi | F16G 5/16 474/261 |
| 2010/0311531 | A1 * | 12/2010 | Nishimi | F16G 5/16 474/242 |
| 2011/0201467 | A1 * | 8/2011 | Kobayashi | F16G 5/16 474/240 |
| 2011/0237376 | A1 | 9/2011 | Sano | |
| 2011/0300980 | A1 * | 12/2011 | Kuwabara | F16G 5/16 474/242 |
| 2012/0190490 | A1 * | 7/2012 | Morino | F16G 5/16 474/240 |
| 2018/0023664 | A1 | 1/2018 | Bransma | |
| 2019/0032750 | A1 * | 1/2019 | Brandsma | F16G 5/16 |
| 2019/0101183 | A1 * | 4/2019 | Ninomiya | F16G 5/00 |
| 2019/0101185 | A1 * | 4/2019 | Ninomiya | F16G 5/16 |
| 2019/0101186 | A1 * | 4/2019 | Ninomiya | F16G 5/16 |
| 2019/0101187 | A1 * | 4/2019 | Ninomiya | F16G 5/16 |
| 2019/0154112 | A1 * | 5/2019 | Ochi | F16G 5/16 |
| 2019/0154113 | A1 * | 5/2019 | Sato | F16G 5/16 |
| 2019/0195315 | A1 * | 6/2019 | Ochi | F16G 5/16 |
| 2019/0234486 | A1 * | 8/2019 | Inase | F16G 5/16 |
| 2019/0346016 | A1 * | 11/2019 | Van Treijen | F16G 5/16 |
| 2020/0011398 | A1 * | 1/2020 | Nakamura | F16G 5/16 |
| 2020/0103000 | A1 * | 4/2020 | Takahashi | F16H 9/12 |
| 2020/0132160 | A1 * | 4/2020 | Inase | F16G 5/16 |
| 2020/0149610 | A1 * | 5/2020 | Ochi | F16G 5/16 |
| 2020/0300335 | A1 * | 9/2020 | Ochi | B21D 53/14 |
| 2021/0116001 | A1 * | 4/2021 | Ishihara | F16H 57/0456 |
| 2021/0148439 | A1 * | 5/2021 | Miyake | F16G 5/16 |

FOREIGN PATENT DOCUMENTS

| | | |
|---|---|---|
| WO | 2011/061850 A1 | 5/2011 |
| WO | 2016/102073 A1 | 6/2016 |

* cited by examiner

TRANSMISSION BELT AND TRANSMISSION BELT ELEMENT

CROSS REFERENCE TO RELATED APPLICATIONS

This application is a National Stage of International Application No. PCT/JP2018/021653, filed Jun. 6, 2018, claiming priority to Japanese Patent Application No. 2017-114202, filed Jun. 9, 2017.

TECHNICAL FIELD

The disclosure relates to a transmission belt and a transmission belt element. The transmission belt has a plurality of elements each including a pair of pillar portions, and a ring that is disposed between the pillar portions of the elements.

BACKGROUND ART

Conventionally, a transmission belt for a continuously variable transmission is known. The transmission belt has a plurality of elements each including a trunk portion (base portion) and a pair of pillar portions extending from a left end or a right end of the trunk portion, and a ring that is disposed between the pillar portions of the elements (for example, see Patent Document 1). In the element of the transmission belt, a pair of rocking edge portions (contact regions) with a convex surface are formed on one face and are spaced away from each other in a width direction, and the adjacent elements rotate with a contact line included in the rocking edge portion serving as a fulcrum.

RELATED ART DOCUMENTS

Patent Documents

Patent Document 1: WO 2016/102073

SUMMARY OF THE DISCLOSURE

In the element described above, it is possible to reduce an area of a part of the pillar portion that protrudes from the ring toward the belt outer peripheral side, compared to a conventional element in which a ring is disposed on both sides of a head portion extending from a center portion of a trunk portion in a width direction toward a belt outer peripheral side. It is thus possible to reduce the cost of materials. However, in the transmission belt including the elements that have the pillar portions, an area of the pillar portions is decreased. Thus, a compaction amount (deformed amount) of the pillar portions in a chord portion (a part that is not wound around a pair of pulleys) of the transmission belt in which a compression force from the pulleys acts on the elements may partly become larger than a compaction amount of the rocking edge portions (trunk portions). In the transmission belt including the elements that have the pillar portions, a disarrangement of the elements may occur in the chord portion in which the compression force acts on the elements when a torque is transmitted, and vibration and noise may be generated.

An aspect of the disclosure is to suppress vibration and noise from being generated when a torque is transmitted between the pulleys of the continuously variable transmission with the transmission belt including the elements that have the pillar portions.

A transmission belt that is wound around a primary pulley and a secondary pulley of a continuously variable transmission, the transmission belt comprising: a plurality of elements each including a trunk portion having a saddle surface, and a pair of pillar portions extending from the trunk portion so as to be positioned on both sides of the saddle surface in a width direction; and a ring disposed between the pillar portions of the elements so as to be in contact with the saddle surface, wherein each of the elements includes: a pair of rocking edge portions with a convex surface, the rocking edge portions being formed on one of a front face and a rear face so that at least a part of the rocking edge portion is extended over the pillar portion, and the rocking edge portions being spaced away from each other in the width direction; and a non-contact portion extended along the saddle surface in the width direction between the rocking edge portions, so as not to be in contact with an adjacent element, and S/A≥3.5 is satisfied, when a sum of widths of end portions of the rocking edge portions on an outer peripheral side of the transmission belt is set as "A", and a sum of surface areas of parts of the pillar portions on the outer peripheral side of the transmission belt with respect to the rocking edge portions on the one of the front face and the rear face which includes the rocking edge portions is set as "S".

Intensive research was carried out to suppress vibration and noise from being generated when a torque is transmitted between the pulleys with the continuously variable transmission including the elements that have the pillar portions. During the research, relationships were examined between the width of the rocking edge portion that is correlated to the compaction amount of the rocking edge portions and the surface area of the part of the pillar portion that is positioned on the outer peripheral side of the rocking edge portion and that is correlated to the compaction amount of the pillar portion, and the curvature of the ring in the chord portion of the transmission belt in which a compression force acts on the elements and the curvature of the approximate curve that passes through the rocking edge portions. The sum of the widths of the end portions of the rocking edge portions is set as "A. The end portion is positioned on the rocking edge portions on the outer peripheral side of the transmission belt. The sum of the surface areas of the parts of the pillar portions on one of the front face and the rear face is set as "S". Here, the part is positioned on the outer peripheral side of the transmission belt with respect to the rocking edge portions. It was found that, when the element is formed so as to satisfy S/A≥3.5 in such a case, a curvature center of the ring generally coincides with a curvature center of an approximate curve that passes through the rocking edge portions, in a chord portion of the transmission belt in which a compression force acts on the elements. In this way, in the transmission belt of the disclosure including the elements that each satisfy S/A≥3.5, it is possible to suppress a disarrangement of the elements from occurring by setting a compaction amount of the rocking edge portions to be larger than a compaction amount of the pillar portions, in the chord portion of the transmission belt in which the compression force acts on the elements. As a result, it is possible to satisfactorily suppress vibration and noise from being generated when a torque is transmitted between the pulleys of the continuously variable transmission with the transmission belt including the elements that have the pillar portions.

DETAILED DESCRIPTION

Modes for carrying out the various aspects of the disclosure will be described below with reference to the drawings.

Figure 1:
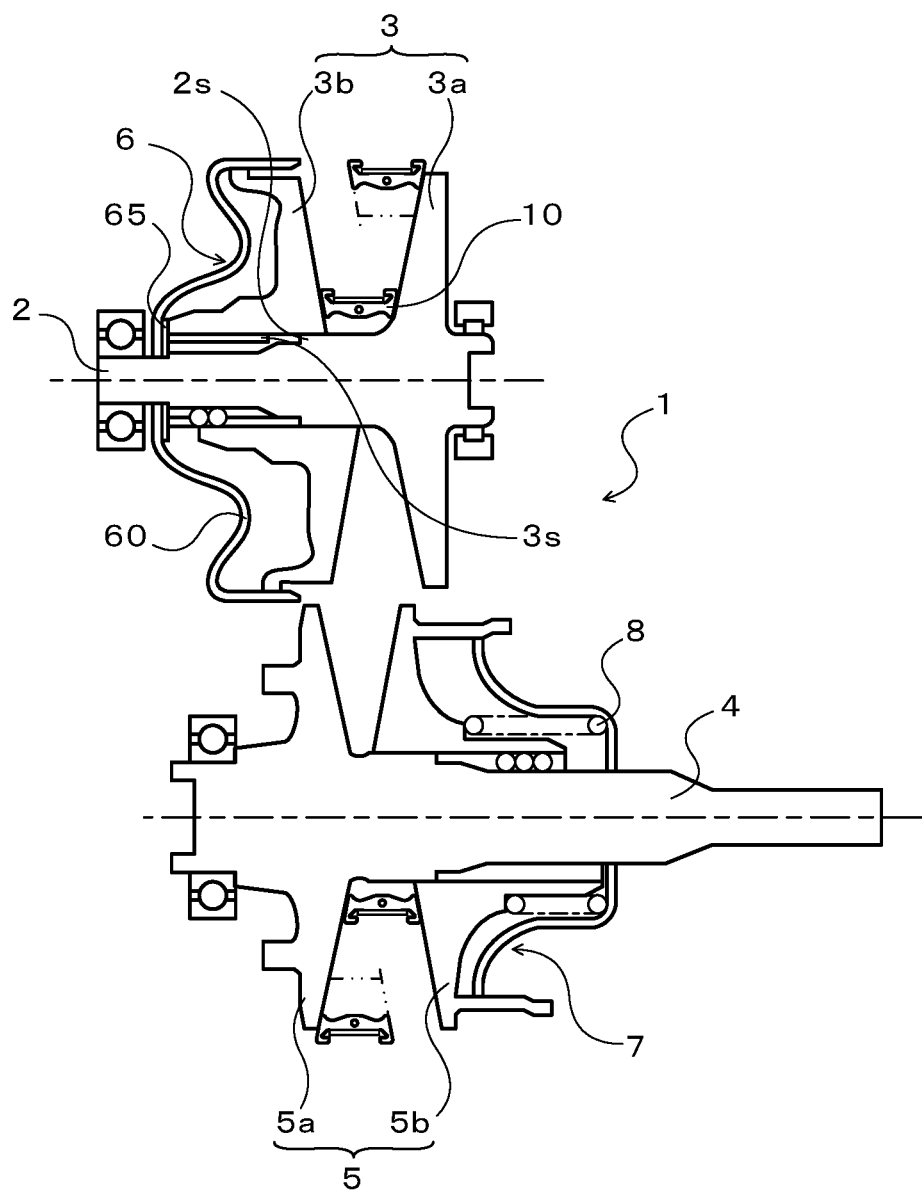
FIG. 1 is a schematic configuration diagram of an example of a continuously variable transmission including a transmission belt of the disclosure.

FIG. 1 is a schematic configuration diagram of a continuously variable transmission (CVT) 1 of the disclosure. The continuously variable transmission 1 illustrated in FIG. 1 is installed in a vehicle and includes: a primary shaft (first shaft) 2 that serves as a driving rotary shaft; a primary pulley (first pulley) 3 disposed in the primary shaft 2; a secondary shaft (second shaft) 4 serving as a driven rotary shaft and disposed on parallel with the primary shaft 2; a secondary pulley (second pulley) 5 disposed in the secondary shaft 4; and a transmission belt 10. As shown in the figure, the transmission belt 10 is wound around a pulley groove (V-shaped groove) of the primary pulley 3 and a pulley groove (V-shaped groove) of the secondary pulley 5.

The primary shaft 2 is coupled to an input shaft (not shown) via a front/reverse switching mechanism not shown. The input shaft is coupled to a power generation source such as an engine (internal combustion engine) of the vehicle. The primary pulley 3 includes a fixed sheave 3a formed integrally with the primary shaft 2, and a movable sheave 3b supported by the primary shaft 2 via a ball spline etc. so as to be slidable in an axial direction. The secondary pulley 5 includes a fixed sheave 5a formed integrally with the secondary shaft 4, and a movable sheave 5b supported by the secondary shaft 4 via a ball spline etc. so as to be slidable in the axial direction and urged in the axial direction by a return spring 8.

The continuously variable transmission 1 includes a primary cylinder 6 that is a hydraulic actuator that changes a width of a groove of the primary pulley 3, and a secondary cylinder 7 that is a hydraulic actuator that changes a width of a groove of the secondary pulley 5. The primary cylinder 6 is formed behind the movable sheave 3b of the primary pulley 3. The secondary cylinder 7 is formed behind the movable sheave 5b of the secondary pulley 5. Working oil is supplied from a hydraulic control device that is not shown to the primary cylinder 6 and the secondary cylinder 7 in order to change the width of the grooves of the primary pulley 3 and the secondary pulley 5. The secondary shaft 4 is coupled to driving wheels of the vehicle via a gear mechanism, a differential gear, and a drive shaft (all not shown).

In the embodiment, a step portion is formed on an end portion (end portion on left side in FIG. 1) on the opposite side of the primary shaft 2 from the engine side. An annular end plate 65 is interposed between the step portion and the primary piston 60 of the primary cylinder 6 so that the end plate 65 can abut against the end portion (end portion on left side in FIG. 1) on the opposite side of the movable sheave 3b of the primary pulley 3 from the engine side. A stopper portion 2s is formed in the primary shaft 2 so that the stopper portion 2s can abut against an end portion on the fixed sheave 3a side of a spline tooth 3s formed on an inner peripheral surface of the movable sheave 3b.

When the movable sheave 3b of the primary pulley 3 is spaced away from the fixed sheave 3a and is abutted against the end plate 65, movement of the movable sheave 3b in a direction away from the fixed sheave 3a with respect to the primary shaft 2 is restricted. In this way, the width of the pulley groove of the primary pulley 3 is maximized and consequently the width of the pulley groove of the secondary pulley 5 is set to the minimum, and a speed ratio γ of the continuously variable transmission 1 is maximized. When the spline tooth 3s formed on the inner peripheral surface of the movable sheave 3b abuts against the stopper portion 2s formed in the primary shaft 2, movement of the movable sheave 3b in a direction toward the fixed sheave 3a with respect to the primary shaft 2 is restricted. In this way, the width of the pulley groove of the primary pulley 3 is minimized and consequently the width of the pulley groove of the secondary pulley 5 is set to the maximum with the transmission belt 10, and the speed ratio γ of the continuously variable transmission 1 is minimized.

Figure 2:
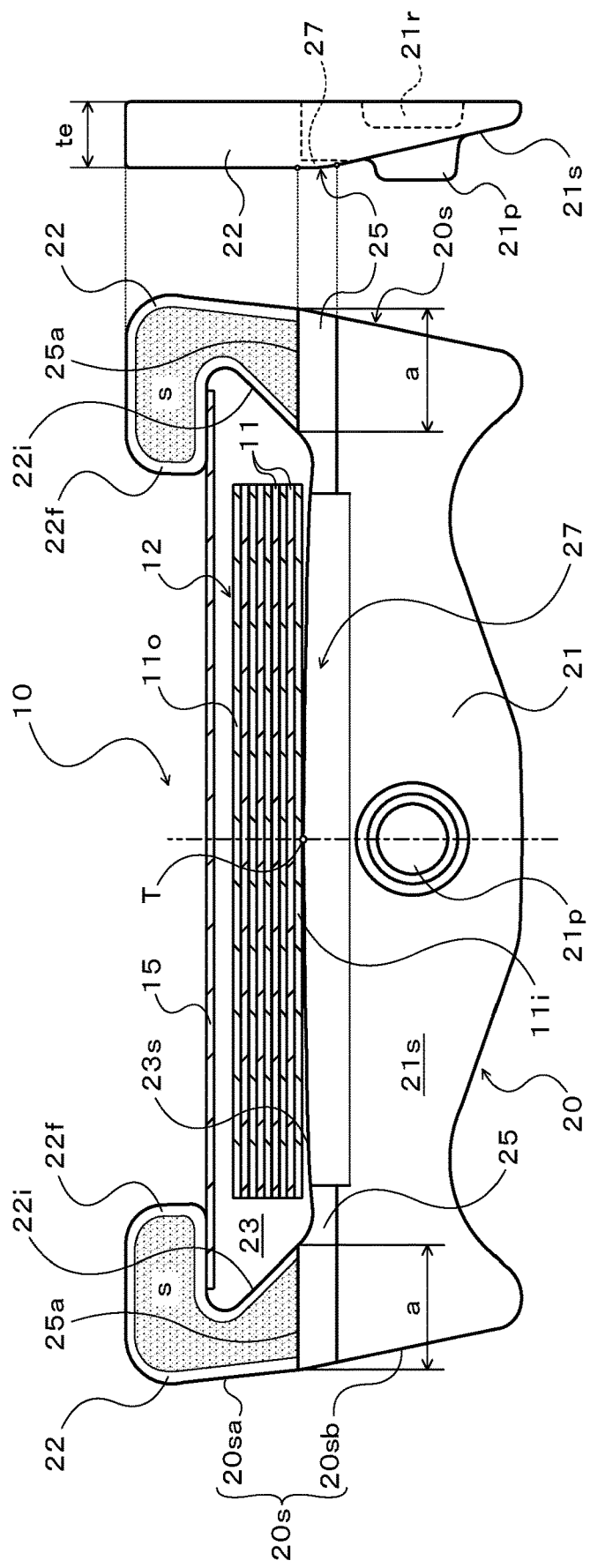
FIG. 2 is a schematic configuration diagram of the transmission belt of the disclosure.

FIG. 2 is a schematic configuration diagram of the transmission belt 10. As illustrated in FIG. 2, the transmission belt 10 includes a laminated ring 12 configured by laminating a plurality of (for example, nine in the embodiment) elastically deformable ring materials 11 in a thickness direction (ring radial direction), a retainer ring 15, and a plurality of (for example, several hundred) elements 20 annularly arranged (bound) along an inner peripheral surface of the laminated ring 12. In the embodiment, the element 20 includes a first element, and a second element that has a thickness (maximum thickness) that is slightly thicker (for example, by around 0.1 mm) than that of the first element. A plurality of the first and second elements are arranged side by side. It is thus possible to suppress vibration and noise from being generated when a torque is transmitted between the primary pulley 3 and the secondary pulley 5 with the transmission belt 10. Since the first and second elements have common structures except for their thickness, hereinafter, the first and second elements will be described by being collectively called the "elements 20".

A plurality of the ring materials 11 that configure the laminated ring 12 are elastically deformable ring materials 11 that are cut out from a drum made of a steel plate. The ring materials 11 are machined so as to have substantially the same thickness and different circumferences that are prescribed for each one. The retainer ring 15 is an elastically deformable ring that is cut out from a drum made of a steel plate for example, and has a thickness that is substantially the same as or thinner than that of the ring materials 11. The retainer ring 15 has an inner circumference that is longer than an outer circumference of an outermost layer ring material 11o of the laminated ring 12. In this way, when the laminated ring 12 and the retainer ring 15 are disposed concentrically (non-load state in which tensile force is not applied), an annular clearance is formed between an outer peripheral surface of the outermost layer ring material 11o and an inner peripheral surface of the retainer ring 15, as illustrated in FIG. 2.

Each element 20 has a symmetrical outer shape punched out from a steel plate by press working. As illustrated in FIG. 2, the element 20 includes a trunk portion 21 extending horizontally in the drawing, a pair of pillar portions 22 extending from both sides of the trunk portion 21 in the same direction, and a single ring housing portion (recessed portion) 23 that is defined between the pillar portions 22 so as to open toward a free end side of each pillar portion 22. The element 20 also includes a pair of side faces 20s that are formed so as to be spaced away from each other as the side faces 20s extend from an inner peripheral side to an outer peripheral side (radially outward of the laminated ring 12) of the transmission belt 10 (laminated ring 12).

The pillar portions 22 extend from both sides of the saddle surface 23s in the width direction and extends radially outward of the laminated ring 12 (in a direction from the inner peripheral side toward the outer peripheral side of the transmission belt 10 (laminated ring 12), that is, upward in the figure). The saddle surface 23s is a bottom surface of the ring housing portion 23. On the free end portion of each pillar portion 22, a hook portion 22f that extends in the width direction of the saddle surface 23s is formed. A pair of the hook portions 22f face each other while being spaced away from each other at an interval that is slightly longer than the width of the laminated ring 12 (ring material 11) and that is shorter than the width of the retainer ring 15. Each pillar portion 22 of the element 20 includes a flat inner surface 22i that is inclined so as to be spaced away from the saddle surface 23s as it extends radially outward of the laminated ring 12. Between the saddle surface 23s and the inner surface 22i of the pillar portion 22, a concave surface (for example, a concave cylindrical surface) that is smoothly continuous with the saddle surface 23s and the inner surface 22i is formed.

As illustrated in FIG. 2, the laminated ring 12 is disposed in the ring housing portion 23 and the saddle surface 23s of the ring housing portion 23 is in contact with the laminated ring 12, that is, an inner peripheral surface of an innermost layer ring material 11i. The saddle surface 23s has a symmetrical convex surface shape (crowned shape) that is gradually inclined downward in the figure as it extends toward the outer side in the width direction with a central portion in the width direction serving as a top portion T. In this way, it is possible to center the laminated ring 12 by applying a centripetal force towards the top portion T to the laminated ring 12 by friction with the saddle surface 23s. However, the saddle surface 23s may include a plurality of convex surfaces that are curved radially outward of the laminated ring 12.

The retainer ring 15 that is elastically deformed is fitted in the ring housing portion 23 between the hook portions 22f of each element 20. The retainer ring 15 is disposed between the outer peripheral surface of the outermost layer ring material 11o of the laminated ring 12 and the hook portions 22f of the element 20 so as to surround the laminated ring 12. With the pillar portions 22, the retainer ring 15 restricts the element 20 from falling out of the laminated ring 12 and restricts the laminated ring 12 from falling out of the element 20. The elements 20 are thus annularly bound (arranged) along the inner peripheral surface of the laminated ring 12. In the embodiment, a single or a plurality of openings (long holes) not shown are formed in the retainer ring 15. In this way, it is possible to make the retainer ring 15 easily elastically deformable and ensure an assembling property of the retainer ring 15 to the elements 20.

As described above, the clearance is formed between the outer peripheral surface of the outermost layer ring material 11o of the laminated ring 12 and the inner peripheral surface of the retainer ring 15. Thus, a tensile force etc. basically does not act on the retainer ring 15 while the continuously variable transmission 1 is being operated. In the element 20, there is no need to make the pillar portion 22 and the hook portion 22f large in order to ensure rigidity etc. It is possible to reduce an area of a part of the pillar portion 22 that protrudes from the laminated ring 12 toward the belt outer peripheral side, compared to a conventional element in which laminated rings are disposed on both sides of a head portion extending from a center portion of a trunk portion in a width direction toward a belt outer peripheral side. With the reduction in the cost of the materials of the element 20, the cost of the transmission belt 10 and also the continuously variable transmission 1 can be reduced.

Each side face 20s of the element 20 includes a first side face 20sa positioned on the pillar portion 22 side, that is, the opposite side (outer side) of the pillar portion 22 from the inner surface 22i, and a second side face 20sb formed so as to be continuous with the first side face 20sa and positioned on the inner side of the first side face 20sa in the radial direction of the laminated ring 12. In the embodiment, a pair of the first side faces 20sa are formed so as to be spaced away from each other as they extend radially outward of the laminated ring 12, similar to the second side faces 20sb. It is thus possible to satisfactorily ensure the strength of the pillar portion 22.

An angle formed by a pair of the second side faces 20sb is set to be nearly equal to an opening angle of the pulley groove of the primary pulley 3 and the secondary pulley 5 (slightly larger than a set value of the opening angle, in the embodiment). An angle formed by a pair of the first side faces 20sa is set to be smaller than the angle formed by the second side faces 20sb. The second side faces 20sb of the element 20 are in frictional contact with the surface of the pulley groove of the primary pulley 3 and the pulley groove of the secondary pulley 5, receive a holding force from the pulleys 3, 5, and become torque transmitting faces (flank faces) that transmit a torque from the primary pulley 3 to the secondary pulley 5 with friction. In contrast, the first side faces 20sa are basically not in contact with the surface of the pulley groove, when a torque is transmitted from the primary pulley 3 to the secondary pulley 5 with the transmission belt 10. On the surface of each second side face 20sb, recesses and projections (a plurality of grooves) not shown are formed, in which the recesses and the projections are for holding hydraulic oil for lubricating and cooling a contact portion of the element 20 and the primary pulley 3 or the secondary pulley 5.

As illustrated in FIG. 2, on a front face (one face) of the element 20, a pair of rocking edge portions (contact regions) 25, a non-contact portion 27, a tapered surface (inclined surface) 21s, and a protrusion (dimple) 21p are formed. The rocking edge portions 25 are formed on the front face of the element 20 and are spaced away from each other in the width direction of the saddle surface 23s so as to be extended over the corresponding pillar portion 22 and the trunk portion 21. The non-contact portion 27 is formed between the rocking edge portions 25 in the width direction described above. In the embodiment, an edge portion on a belt inner peripheral side of the non-contact portion 27 (lower edge portion in FIG. 2) is positioned on a belt inner peripheral side (lower side in the figure) of an edge portion of the belt inner peripheral side of the rocking edge portion 25 (lower edge portion in FIG. 2). The tapered surface 21s is formed on the front face (one of the faces) of the trunk portion 21 so as to extend from the non-contact portion 27 and the rocking edge portions 25 to the opposite side of a protruding direction of the pillar portions 22, that is, so as to extend toward the belt inner peripheral side (lower side in FIG. 2). The protrusion 21p protrudes from the tapered surface 21s in the central portion on the front face of the trunk portion 21 in the width direction.

Figure 3:
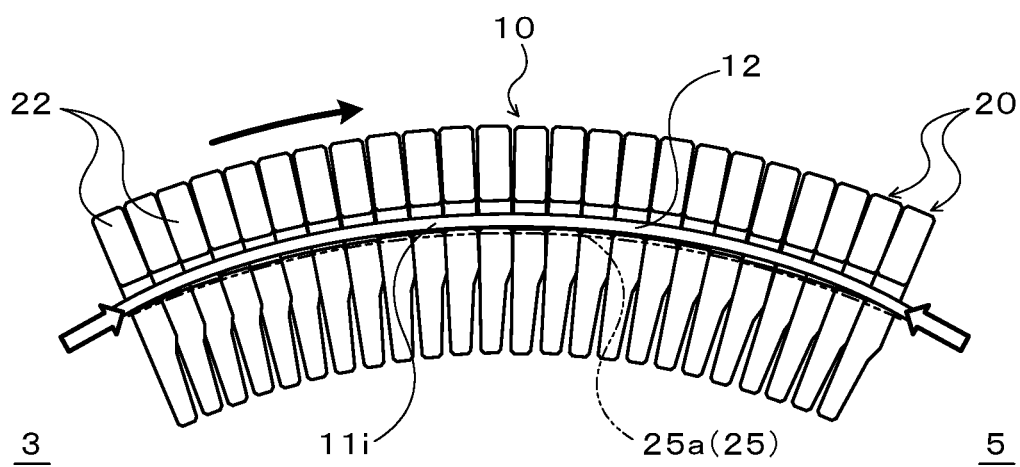
FIG. 3 is a schematic diagram of an arrangement of a plurality of elements in a chord portion of the transmission belt.

In the embodiment, the front face of the element 20 (mainly the front face of the pillar portion 22) that is positioned on a belt outer peripheral side of the rocking edge portion 25 and the non-contact portion 27, and a rear face of the element 20 (other face) are each formed to be flat, as illustrated in FIG. 3. The pillar portion 22 of the element 20 has a generally constant thickness te. However, since the element 20 is formed by press working, a so-called shear droop occurs on a peripheral portion of the pillar portion 22. A region (see portion with half-tone dot meshing in FIG. 2) that is surrounded by the peripheral portion and the rocking edge portion 25 is formed to be flat on front and rear faces of the pillar portion 22.

As illustrated in FIG. 3, the tapered surface 21s that is positioned on the belt inner peripheral side (lower side in FIGS. 2 and 3) of the rocking edge portion 25 and the non-contact portion 27 is brought closer to the rear face (back face) as the tapered surface 21s extends away from the pillar portion 22 (as the tapered surface 21s extends toward the belt inner peripheral side). On the rear face of the element 20 (trunk portion 21), a recessed portion 21r is formed so as to be positioned on the back side of the protrusion 21p. When the transmission belt 10 is assembled, the protrusion 21p of the adjacent element 20 is loosely fitted in the recessed portion 21r.

The rocking edge portion 25 is a convex surface that has a short belt shape. In the embodiment, the rocking edge portion 25 is a cylindrical surface (curved surface) having a predetermined curvature radius and a width in the radial direction. The rocking edge portion 25 includes a contact line at which the adjacent elements 20 are in contact with each other and which serves as a fulcrum of rotation of the adjacent elements 20. A position of the contact line varies within a range of the rocking edge portion 25 based on the speed ratio γ of the continuously variable transmission 1. In the embodiment, an end portion of the rocking edge portion 25 on the outer peripheral side of the transmission belt 10 (upper side in the figure, that is, the pillar portion 22 side) is positioned on the outer side of the saddle surface 23s (top portion T) in the radial direction of the transmission belt 10. An end portion of the rocking edge portion 25 on the inner peripheral side of the transmission belt 10 (lower side in the figure, that is, the tapered surface 21s side) is positioned on the inner side of the saddle surface 23s (bottom portion) in the radial direction of the transmission belt 10. The rocking edge portion 25 may be formed on the rear face of the element 20.

The non-contact portion 27 is a belt-shaped recessed portion that is formed on the front face (one of the faces) of the trunk portion 21 so as to open toward the saddle surface 23s, extend along the saddle surface 23s in the width direction, and divide the rocking edge portions 25. The surface (bottom surface) of the non-contact portion 27 is recessed to the rear face side with respect to the surface of the rocking edge portion 25. Thus, the thickness of the saddle surface 23a is less than the thickness to of the pillar portion 22. Corner portions of the non-contact portion 27 and edge portions of the trunk portion 21 that define the non-contact portion 27 are chamfered etc. so as to be rounded.

By forming such a non-contact portion 27 in the element 20, it is possible to satisfactorily suppress contact with the adjacent element 20 in parts other than the rocking edge portion 25, that is, it is possible to satisfactorily suppress the adjacent element 20 from being in contact with the non-contact portion 27, in the transmission belt 10. As a result, it is possible to suppress a load from the center portion in the width direction of the element 20 on which a large moment acts from being applied to the adjacent element 20 and suppress the element 20 from being deformed, and thus, improve the durability of the element 20.

When a torque is transmitted from the primary pulley 3 to the secondary pulley 5 with the transmission belt 10 including the elements 20 described above, a compression force is applied from the pulleys 3, 5 to the elements 20, in a chord portion. Here, the chord portion (hereinafter referred to as a "compression chord portion") is a chord portion in which the elements 20 advance from the primary pulley 3 toward the secondary pulley 5, among two chord portions that are portions of the transmission belt 10 that are not wound around the pulleys 3, 5. In the compression chord portion, a compaction amount (deformed amount) of the rocking edge portions 25 (trunk portions 21) each of which is a contact portion of the adjacent elements 20 is increased, and a compaction amount of the pillar portions 22 is decreased. As it can be seen in FIG. 3, a curvature center of the inner peripheral surface of the laminated ring 12 (innermost ring material 11i) generally coincides with a curvature center of an approximate curve (see a long dashed double-short dashed line in FIG. 3) that extends through end portions 25a each of which is positioned on the rocking edge portions 25 on the outer peripheral side of the transmission belt 10. In the compression chord portion, it is thus possible to arrange the elements 20 without disorder, as illustrated, and suppress vibration and noise from being generated when a torque is transmitted.

Figure 4:
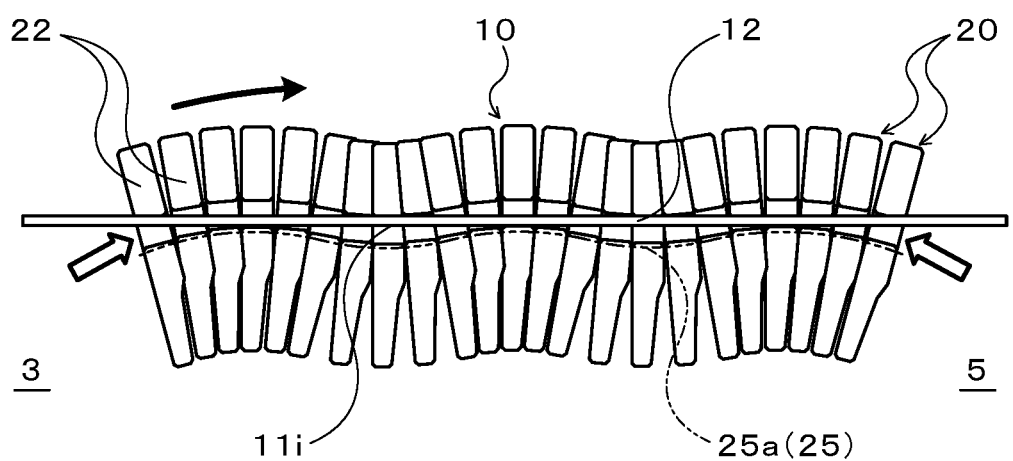
FIG. 4 is a schematic diagram of the arrangement of the elements in the chord portion of the transmission belt.

However, in the transmission belt 10 including the elements 20 that have the pillar portions 22, an area of a part of the pillar portion 22 that protrudes toward the belt outer peripheral side with respect to the laminated ring 12 is decreased. A part of the element 20 on the pillar portion 22 side is likely to tilt in the rotational direction of the transmission belt 10 or the opposite direction thereof. As it is apparent in FIG. 4, the compaction amount (deformed amount) of the pillar portions 22 in the compression chord portions may partly become larger than the compaction amount of the rocking edge portions 25 (trunk portions 21). In this case, a plurality of curvature centers of the approximate curve that extends through the end portions 25a of the rocking edge portions 25 (long dashed double-short dashed line in FIG. 4) are formed and the curvature centers thereof do not match with the curvature center of the laminated ring 12. A plurality of curvature radii of the approximate curve all become smaller than the curvature radius of the inner peripheral surface of the laminated ring 12 (innermost ring material 11i). As a result, when a torque is transmitted, a disarrangement of the elements 20 may occur in the compression chord portion and vibration and noise may be generated.

With this in mind, research was focused on the width of the rocking edge portion 25 that is correlated to the compaction amount of the rocking edge portions 25 and a surface area of a part of the pillar portion 22 that is positioned on the outer peripheral side of the transmission belt 10 with respect to the rocking edge portion 25. In order to suppress vibration and noise from being generated when a torque is transmitted between the pulleys 3, 5 with the transmission belt 10, the the relationship between the width and the surface area was examined, and the curvature of the laminated ring 12 in the compression chord portion and the curvature of the approximate curve that passes through the rocking edge portions 25.

Figure 5:
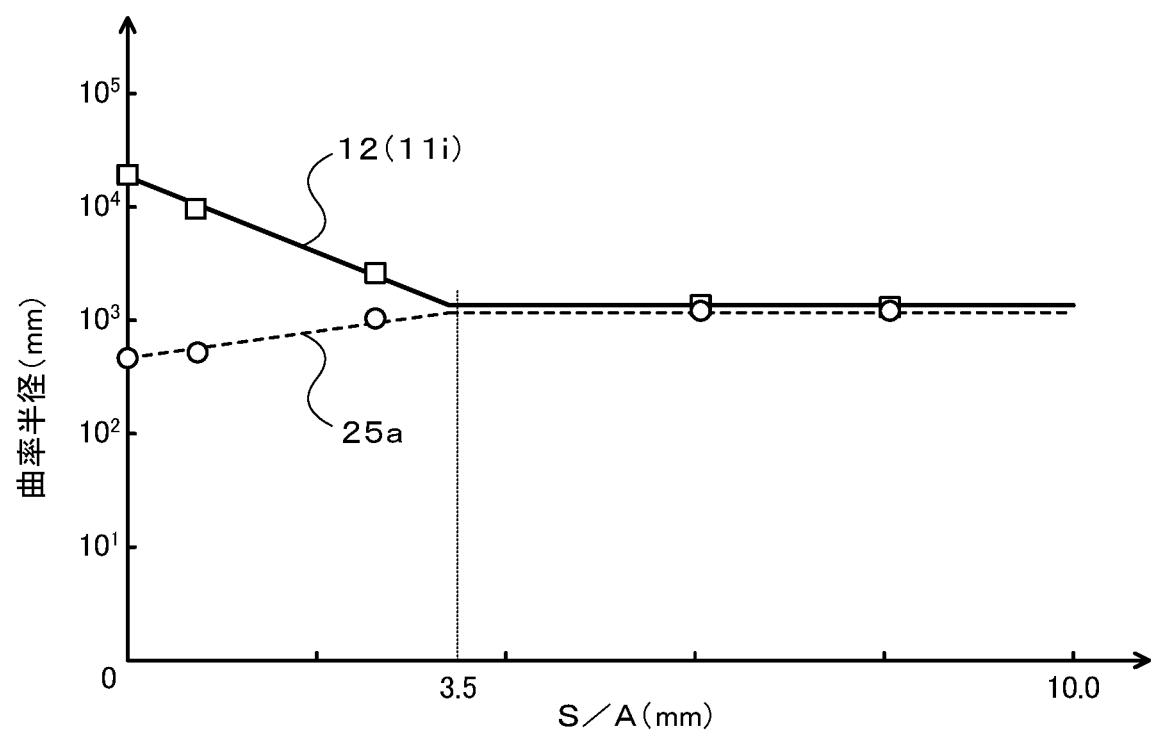
FIG. 5 is a graph of a relationship between a sum of widths of end portions of a pair of rocking edge portions that is positioned on a belt outer peripheral side, a sum of surface areas of parts of a pair of pillar portions that is positioned on the belt outer peripheral side of the rocking edge portions, and a curvature of a ring and a curvature of an approximate curve that passes through the rocking edge portions.

Specifically, a sum of widths a of the end portions 25a of a pair of the rocking edge portions 25 is set as "A" (in the embodiment, A=2×a, which is approximately 5.7 mm). Here, the end portions 25a are positioned on the belt outer peripheral side. A sum of surface areas s of parts of a pair of the pillar portions 22 on a front face of the element 20 including the rocking edge portion 25 is set as "S" (in the embodiment, S=2×s, which is approximately 20 mm$^2$). Here, each part is a flat portion positioned on the belt outer peripheral side of the rocking edge portion 25 and is in contact with the adjacent element 20 (see the part with half-tone dot meshing in FIG. 2). Changes in the curvature of the laminated ring 12 in the compression chord portion and the curvature of an approximate curve that passes through the end portions 25a of the rocking edge portions 25, with respect to a value S/A, are obtained with analysis. As a result, it was found that in the compression chord portion, a curvature center of the inner peripheral surface of the innermost layer ring material 11i (laminated ring 12) that is in contact with the top portion T of the saddle surface 23s generally coincides with a curvature center of the approximate curve that passes through the end portions 25a of the rocking edge portions 25 when S/A≥3.5 is satisfied, as shown in FIG. 5. In the same case, it was also found that a curvature radius of the inner peripheral surface described above generally coincides with a curvature radius of the approximate curve described above.

According to the research and the analysis results, in the transmission belt 10 of the embodiment, each element 20 is formed so that S/A≥3.5 is satisfied. In this way, it is possible to set the compaction amount of the rocking edge portions 25 to be larger than the compaction amount of the pillar portions 22 so as to suppress a disarrangement of the elements 20 from occurring (see FIG. 3). As a result, it is possible to satisfactorily suppress vibration and noise from being generated when a torque is transmitted between the pulleys 3, 5 of the continuously variable transmission 1 with the transmission belt 10 including the elements 20 that have the pillar portions 22.

When S/A≥3.5 is satisfied, it is possible to arrange the elements 20 in the compression chord portion without disorder so as to suppress vibration and noise from being generated. However, there is a limit to the amount of which the width of the rocking edge portion 25 can be expanded in each element 20, and the larger the value S/A is, the larger the surface area (projected area) of the pillar portion 22 becomes. The cost of materials is increased due to the element 20 increasing in size. It is thus preferable that the element 20 be formed so as to satisfy 3.5≤S/A≤5.0, and more preferably 3.5≤S/A≤4.0. In this way, it is possible to satisfactorily suppress vibration and noise from being generated when a torque is transmitted between the pulleys 3, 5 of the continuously variable transmission 1 with the transmission belt 10. It is also possible to decrease the surface area (projected area) of the pillar portions 22 so as to decrease the cost of materials of the element 20.

The sum A of the widths of the rocking edge portions 25 may be a sum of a length of an intersecting line between a straight line passing through the top portion T of the saddle surface 23s and extending in the width direction when the element 20 is viewed in plan (a plane that is tangent to the saddle surface 23s at the top portion T) and the surface of the rocking edge portion 25. Suppose the sum of the length of the intersecting line between the straight line passing through the top portion T of the saddle surface 23s extending in the width direction and the rocking edge portion 25 is set as "A" and the element 20 is formed so that S/A≥3.5 is satisfied. Even in such a case, it has been revealed that in the compression chord portion, the curvature center of the inner peripheral surface of the innermost ring material 11i (laminated ring 12) that is in contact with the top portion T of the saddle surface 23s generally coincides with the curvature center of the approximate curve that passes through the above described intersecting line of the rocking edge portion 25, according to the analysis carried out. In the same case, it has also been revealed that the curvature radius of the inner peripheral surface described above generally coincides with the curvature radius of the approximate curve described above.

In the embodiment described above, the end portion on the belt outer peripheral side of the rocking edge portion 25 is positioned on the outer side of the saddle surface 23s (top portion T) in the radial direction of the transmission belt 10. The end portion on the belt inner side of the rocking edge portion 25 is positioned on the inner side of the saddle surface 23s (bottom portion) of the transmission belt 10 in the radial direction. However, the configuration of the end portions is not limited to this. That is, the rocking edge portion 25 may be formed so that the end portion on the belt outer peripheral side or the end portion on the belt inner peripheral side overlaps with a straight line passing through the rocking edge portion 25 and the top portion T of the saddle surface 23s and extending in the width direction.

Figure 6:
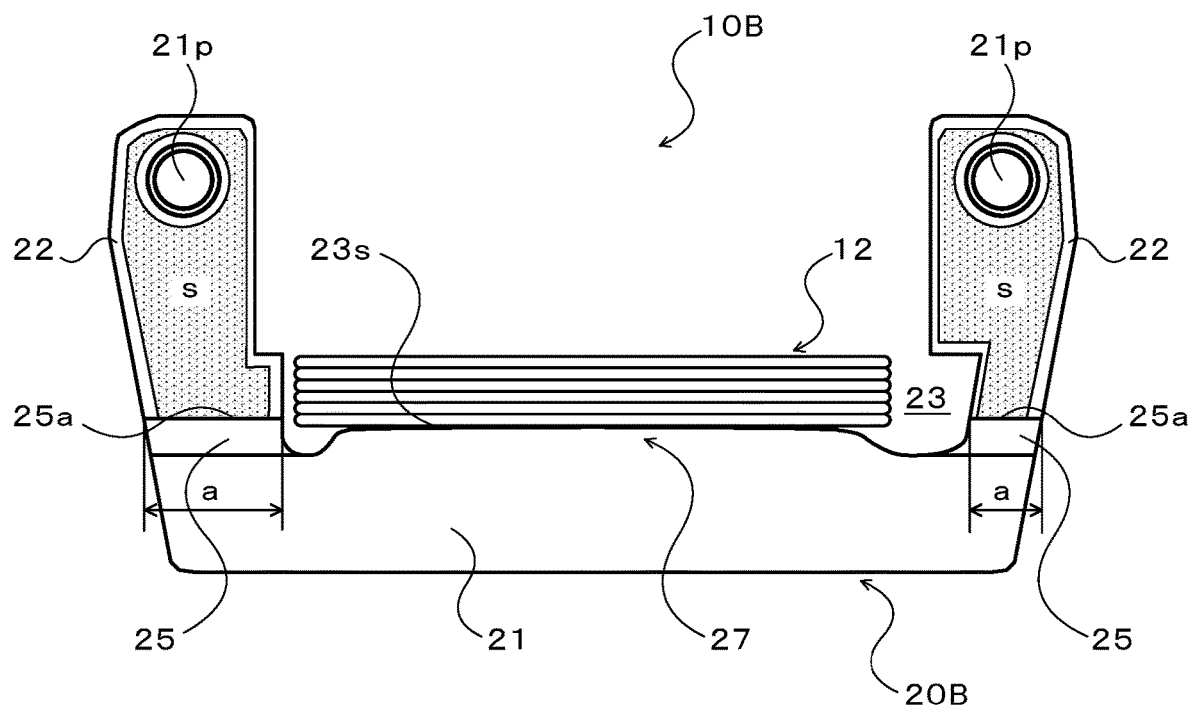
FIG. 6 is a schematic configuration diagram of a transmission belt element according to a modified form.

The element 20 has an outer shape that is symmetrical. However, the outer shape of the element 20 is not limited to this. That is, the transmission belt element of the disclosure may be formed so as to have an asymmetrical outer shape, as shown by an element 20B illustrated in FIG. 6. As shown by the element 20B illustrated in FIG. 6, the protrusion 21p (and the recessed portion) may be formed on the pillar portion 22 instead of on the trunk portion 21. When the protrusion 21p (and the recessed portion) is formed on the pillar portion 22 in this way, a sum of surface areas s of a part of the pair of pillar portions 22 that are in contact with the adjacent element 20B may be set as the "S" described above. Here, such a part of the pillar portion is defined by excluding a peripheral portion in which a shear droop is formed and a periphery of the protrusion 21p from a part on the front face or the rear face of the element 20B that is positioned on the belt outer peripheral side of the rocking edge portion 25. However, the part of the pillar portion 22 that is positioned on the belt outer peripheral side of the rocking edge portion 25 and that is in contact with the adjacent element 20B is not limited to a continuous region, and may be a region that is divided by the protrusion 21p.

In the transmission belt 10 described above, the hook portions 22f are provided on each element 20 and the retainer ring 15 is disposed between the laminated ring 12 and the hook portions 22f of the elements 20. However, the configuration of the transmission belt 10 is not limited to this. That is, the configuration of the pillar portion 22 is not limited to the configuration of the element 20 described above. As shown by the element 20B illustrated in FIG. 6, the hook portion 22f may be omitted from the pillar portion 22. In addition, the retainer ring 15 may be omitted from the transmission belt of the disclosure, as shown by a transmission belt 10B illustrated in FIG. 6. The continuously variable transmission 1 may be configured so that the primary shaft 2 and the secondary shaft 4 are selectively coupled to the input shaft and the primary shaft 2 and the secondary shaft 4 are selectively coupled to the drive shaft of the vehicle.

As described above, the transmission belt of the disclosure is a transmission belt (10, 10B) that is wound around a primary pulley (3) and a secondary pulley (5) of a continuously variable transmission (1), the transmission belt (10, 10B) including: a plurality of elements (20, 20B) each including a trunk portion (21) having a saddle surface (23s), and a pair of pillar portions (22) extending from the trunk portion (21) so as to be positioned on both sides of the saddle surface (23s) in a width direction; and a ring (12) disposed between the pillar portions (22) of the elements (20, 20B) so as to be in contact with the saddle surfaces (22). Each of the elements (20, 20B) includes: a pair of rocking edge portions (25) with a convex surface, the rocking edge portions being formed on one of a front face and a rear face so that at least a part of the rocking edge portion is extended over the pillar portion (22), and the rocking edge portions (25) being spaced away from each other in the width direction; and a non-contact portion (27) extended along the saddle surface (23s) in the width direction between the rocking edge portions (25), so as not to be in contact with an adjacent element (20, 20B). S/A≥3.5 is satisfied, when a sum of widths (a) of end portions (25a) of the rocking edge portions (25) on an outer peripheral side of the transmission belt (10, 10B) is set as "A". A sum of surface areas (s) of parts of the pillar portions (22) on the outer peripheral side of the transmission belt (10, 10B) with respect to the rocking edge portions (25) on the one of the front face and the rear face which includes the rocking edge portions (25) is set as "S".

As described above, the sum of the widths of the end portions of the rocking edge portions on the outer peripheral side of the transmission belt is set as "A". The sum of the surface areas of the parts of the pillar portions on the outer peripheral side of the transmission belt with respect to the rocking edge portions on the one of the front face and the rear face which includes the rocking edge portions is set as "S". It was found that, when the element is formed so as to satisfy S/A≥3.5, a curvature center of the ring generally coincides with a curvature center of an approximate curve that passes through the rocking edge portions, in a chord portion of the transmission belt in which a compression force acts on the elements. In this way, in the transmission belt of the disclosure including the elements that each satisfy S/A≥3.5, it is possible to suppress a disarrangement of the elements from occurring by setting a compaction amount of the rocking edge portions to be larger than a compaction amount of the pillar portions, in the chord portion of the transmission belt in which the compression force acts on the elements. As a result, it is possible to satisfactorily suppress vibration and noise from being generated when a torque is transmitted between the pulleys of the continuously variable transmission with the transmission belt including the elements that have the pillar portions.

The transmission belt (10, 10B) may satisfy 3.5≤S/A≤5.0 or may satisfy 3.5≤S/A≤4.0. In this way, it is possible to satisfactorily suppress vibration and noise from being generated when a torque is transmitted between the pulleys of the continuously variable transmission with the transmission belt. It is also possible to decrease the surface area (projected area) of the pillar portions so as to decrease the cost of materials of the element.

The end portion of the rocking edge portion (25) on the outer peripheral side of the transmission belt (10, 10B) may be positioned on an outer side of the saddle surface (23s) in a radial direction of the transmission belt (10, 10B). An end portion of the rocking edge portion (25) on an inner peripheral side of the transmission belt (10, 10B) may be positioned on an inner side of the saddle surface (23s) in the radial direction.

The transmission belt element of the disclosure is a transmission belt element (20, 20B) that includes: a trunk portion (21) having a saddle surface (23s) that is in contact with a ring (12) of a transmission belt (10, 10B) that is wound around a primary pulley (3) and a secondary pulley (5) of a continuously variable transmission (1); and a pair of pillar portions (22) extending from the trunk portion (21) so as to be positioned on both sides of the saddle surface (23s) in a width direction. The transmission belt element (20, 20B) includes: a pair of rocking edge portions (25) with a convex surface, the rocking edge portions being formed on one of a front face and a rear face so that at least a part of the rocking edge portion is extended over the pillar portion (22), and the rocking edge portions (25) being spaced away from each other in the width direction; and a non-contact portion (27) extended along the saddle surface (23s) in the width direction between the rocking edge portions (25), so as not to be in contact with an adjacent element (20). S/A≥3.5 is satisfied, when a sum of widths (a) of end portions (25a) of the rocking edge portions (25) on an outer peripheral side of the transmission belt (10, 10B) is set as "A". A sum of surface areas (s) of parts of the pillar portions (22) on the outer peripheral side of the transmission belt (10, 10B) with respect to the rocking edge portions (25) on the one of the front face and the rear face which includes the rocking edge portions (25) is set as "S".

In the transmission belt including the elements, it is possible to suppress a disarrangement of the elements from occurring by setting a compaction amount of the rocking edge portions to be larger than a compaction amount of the pillar portions, in the chord portion of the transmission belt in which a compression force acts on the elements. As a result, it is possible to satisfactorily suppress vibration and noise from being generated when a torque is transmitted between the pulleys of the continuously variable transmission with the transmission belt including the elements that have the pillar portions.

It should be understood that the present disclosure is not limited in any way to the above embodiments, and various modifications can be made within the spirit and scope of the present disclosure. Furthermore, the embodiments described above are merely specific forms of the various aspects of invention described in the "SUMMARY OF THE DISCLOSURE" section, and do not limit the elements of those aspects described in the "SUMMARY OF THE DISCLOSURE" section.

INDUSTRIAL APPLICABILITY

The various aspects according to the disclosure are applicable to the manufacturing industry of continuously variable transmissions and transmission belts, etc.

The invention claimed is:
1. A transmission belt that is wound around a primary pulley and a secondary pulley of a continuously variable transmission, the transmission belt comprising:
  a plurality of elements each including a trunk portion having a saddle surface, and a pair of pillar portions extending from the trunk portion so as to be positioned on both sides of the saddle surface in a width direction; and
  a ring disposed between the pillar portions of the plurality of elements so as to be in contact with the saddle surfaces, wherein
  each of the plurality of elements includes:
    a pair of rocking edge portions with a convex surface, the rocking edge portions being formed on one of a front face and a rear face so that at least a part of each rocking edge portion is extended over each corre- sponding pillar portion, and the rocking edge portions being spaced away from each other in the width direction; and a non-contact portion extended along the saddle surface in the width direction between the rocking edge portions, so as not to be in contact with an adjacent element, and $S/A \geq 3.5$ is satisfied, when a sum of widths of end portions of the rocking edge portions on an outer peripheral side of the transmission belt is set as "A", and a sum of surface areas of parts of the pillar portions on the outer peripheral side of the transmission belt with respect to the rocking edge portions on the one of the front face and the rear face which includes the rocking edge portions is set as "S".

2. The transmission belt according to claim 1, wherein $3.5 \leq S/A \leq 5.0$ is satisfied.

3. The transmission belt according to claim 1 wherein $3.5 \leq S/A \leq 4.0$ is satisfied.

4. The transmission belt according to claim 1, wherein the end portions of the rocking edge portions on the outer peripheral side of the transmission belt is positioned on an outer side of the saddle surface in a radial direction of the transmission belt, and an end portions of the rocking edge portions on an inner peripheral side of the transmission belt is positioned on an inner side of the saddle surface in the radial direction.

5. A transmission belt element comprising:

a trunk portion having a saddle surface that is in contact with a ring of a transmission belt that is wound around a primary pulley and a secondary pulley of a continuously variable transmission; and a pair of pillar portions extending from the trunk portion so as to be positioned on both sides of the saddle surface in a width direction, wherein the transmission belt element includes:

a pair of rocking edge portions with a convex surface, the rocking edge portions being formed on one of a front face and a rear face so that at least a part of each rocking edge portion is extended over each corresponding pillar portion, and the rocking edge portions being spaced away from each other in the width direction; and a non-contact portion extended along the saddle surface in the width direction between the rocking edge portions, so as not to be in contact with an adjacent transmission belt element, and $S/A \geq 3.5$ is satisfied, when a sum of widths of end portions of the rocking edge portions on an outer peripheral side of the transmission belt is set as "A", and a sum of surface areas of parts of the pillar portions on the outer peripheral side of the transmission belt with respect to the rocking edge portions on the one of the front face and the rear face which includes the rocking edge portions is set as "S".

* * * * *